United States Patent
Tessier (10) Patent No.: US 10,062,885 B2
(45) Date of Patent: Aug. 28, 2018

(54) BATTERY TRAY GLIDE SYSTEM

(71) Applicant: Thomas Gerald Tessier, Spring Valley, WI (US)

(72) Inventor: Thomas Gerald Tessier, Spring Valley, WI (US)

( * ) Notice: Subject to any disclaimer, the term of this patent is extended or adjusted under 35 U.S.C. 154(b) by 0 days.

(21) Appl. No.: 15/805,610

(22) Filed: Nov. 7, 2017

(65) Prior Publication Data
US 2018/0130983 A1   May 10, 2018

Related U.S. Application Data (60) Provisional application No. 62/497,084, filed on Nov. 7, 2016.

(51) Int. Cl.
*H01M 2/10* (2006.01)

(52) U.S. Cl.
CPC ...... *H01M 2/1083* (2013.01); *H01M 2220/20* (2013.01)

(58) Field of Classification Search
CPC .. H01M 2/1083; H01M 2220/20; B60K 1/04; B60K 5/12
USPC ........................................................ 180/68.5
See application file for complete search history.

(56) References Cited

U.S. PATENT DOCUMENTS

| | | | | |
|---|---|---|---|---|
| 2,548,256 A | * | 4/1951 | Deo ..................... | H01M 2/1083 180/68.5 |
| 3,003,573 A | * | 10/1961 | Lorenz ................... | B60R 16/04 180/68.5 |
| 3,989,118 A | * | 11/1976 | Hansen .................... | B60R 16/04 180/68.5 |
| 4,779,692 A | * | 10/1988 | Hagarty .................. | B60R 16/04 105/51 |
| 5,301,765 A | * | 4/1994 | Swanson .................. | B60K 1/04 104/34 |
| 5,760,569 A | * | 6/1998 | Chase, Jr. ................ | B60K 1/04 104/34 |
| 5,806,948 A | * | 9/1998 | Rowan, Sr. ........... | H04M 19/00 180/68.5 |
| 6,050,358 A | * | 4/2000 | Kays ....................... | B60K 5/12 16/358 |
| 6,224,998 B1 | * | 5/2001 | Brouns ................... | B60R 16/04 429/100 |
| 7,913,786 B2 | * | 3/2011 | Voigt ...................... | B60R 16/04 180/68.5 |
| 8,757,458 B2 | * | 6/2014 | Nebel ..................... | B60R 11/06 224/403 |

(Continued)

*Primary Examiner* — Hau Van Phan
(74) *Attorney, Agent, or Firm* — Vidas, Arrett & Steinkraus, P.A.

(57) ABSTRACT

A tray glide system includes a frame having opposite sides, and a base defining an interior, where a tray slides relative to the frame. Glide mounts formed of ultra-high molecular weight polyethylene are attached to the base in the interior, and are located under the tray providing sliding of the tray relative to the frame. Glide rails are engaged to the bottom of the tray and are shaped to engage one or more surfaces of the slide mounts. Each of the glide rails includes a bearing ledge proximate to one of the opposite sides of the frame. An upper guide rail is attached to each of the opposite walls. Each upper guide rail has a horizontal retaining ledge positioned above one of the bearing ledges, to engage the bearing ledges, and to prevent downward pivoting of the tray during withdraw of the tray from the frame.

17 Claims, 4 Drawing Sheets

(56) References Cited

U.S. PATENT DOCUMENTS

| | | | | |
|---|---|---|---|---|
| 9,254,871 B2* | 2/2016 | Hotta | ............... | B62D 21/155 |
| 2001/0023786 A1* | 9/2001 | Maynard | ............ | B62D 39/00 |
| | | | | 180/89.1 |
| 2005/0092536 A1* | 5/2005 | Takeda | ................ | B60K 1/04 |
| | | | | 180/68.5 |
| 2005/0274556 A1* | 12/2005 | Chaney | ............... | B60K 1/04 |
| | | | | 180/68.5 |

* cited by examiner

BATTERY TRAY GLIDE SYSTEM

CROSS-REFERENCES TO RELATED APPLICATIONS

The present application claims priority to U.S. Provisional Patent Application Ser. No. 62/497,084 filed on Nov. 7, 2016 which is incorporated by reference herein in its entirety.

STATEMENT REGARDING FEDERALLY SPONSORED RESEARCH OR DEVELOPMENT

Not Applicable.

FIELD OF THE INVENTION

This invention relates to the hardware field, and the battery compartment slide components for school buses and other vehicles. More specifically, the invention improves upon the utility of an existing battery chamber sliding mechanism.

BACKGROUND OF THE INVENTION

In the past the known battery compartment slide components for school buses, trucks, and other vehicles incorporated the use of brackets, slides and rollers as conventionally used in heavy duty drawers. The metallic components of the slides and rollers when repeatedly exposed to moisture, salt or other road chemicals, dust, and/or cold or adverse weather conditions, frequently caused premature fracture and failure of the slides or rollers necessitating replacement.

In the past the known battery compartment slide components for school buses, trucks, and other vehicles were subject to functionality and performance failures which resulted from excessive wear and tear, causing the breakdown of the materials forming the roller slides, rendering the known mechanisms inoperable.

In the past the components of the known battery compartment slide mechanisms were constructed of metal which were subject to corrosion. In addition, friction from vehicle movement on the components of the battery compartment slide mechanisms caused many of the components to fail. In the past the components of the battery compartment slide mechanisms also required ongoing lubrication and maintenance increasing the expense for operation of the vehicle.

Premature failure of the components of the battery compartment slide mechanisms due to corrosion and wear also frequently resulted in the destabilization of the vehicle battery box, rendering the inspection or replacement of one or more batteries extremely difficult. The degradation in the stability of the battery box also permits excessive battery motion, which adversely impacts battery integrity, function and life.

Replacement of a battery slide mechanism for a vehicle results in significant downtime for repair, increasing the maintenance expense for replacement parts, and professional mechanic's services. The risk to the safety of individuals is also increased due to the enhanced likelihood of battery and vehicle failure during personnel transport or other vehicle use.

Further, the known replacement parts for the battery slide mechanism are formed of materials which are similar or identical to the materials known to be used in original manufacture design, which are subject to the same corrosion and functionality failures as identified necessitation ongoing maintenance.

The art referred to and/or described herein is not intended to constitute an admission that any patent, publication or other information referred to is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entireties.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

BRIEF DESCRIPTION OF THE INVENTION

The invention relates to a battery tray glide system using Ultra High Molecular Weight (UHMW) Polyethylene material which is a rugged polymer having abrasion resistant, impact resistant, non-stick and self-lubricating properties. The invention further includes a stainless-steel tracking system. The combination of the Ultra High Molecular Weight (UHMW) Polyethylene slide material and the stainless-steel tracking system helps to prevent the common problem of corrosion in the battery compartment slide components, and the breakdown of parts due to friction and excessive wear. The UHMW Polyethylene battery tray mounts, and the stainless-steel upper and lower glide rails, improves the longevity of the battery tray glides and facilitates the ease of use, eliminating the need for ongoing lubrication and maintenance services.

The concept and design of the battery tray glide system has applications for any vehicle or piece of equipment that is constructed with a battery box system similar to that of a bus, including but not necessarily limited to recreational vehicles, semi tractor-trailer transport vehicles, farm and construction equipment, or any other type of vehicle or equipment designed and constructed with a pullout battery tray. The battery tray glide system is particularly beneficial for use in vehicles/equipment which are exposed to the elements; resulting in corrosion and ultimately the malfunctioning of the battery slide mechanism.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE DRAWINGS

A detailed description of the invention is hereafter described with specific reference being made to the drawings in which.

DESCRIPTION OF THE INVENTION

Referring to the figures, in general, the battery tray glide system is identified by reference numeral 10. The primary components of the battery tray glide system 10 are the battery box 12, the battery tray 14, the glide Mounts 16, the battery tray glide rails 18, and the upper glide rails 20.

Figure 1:
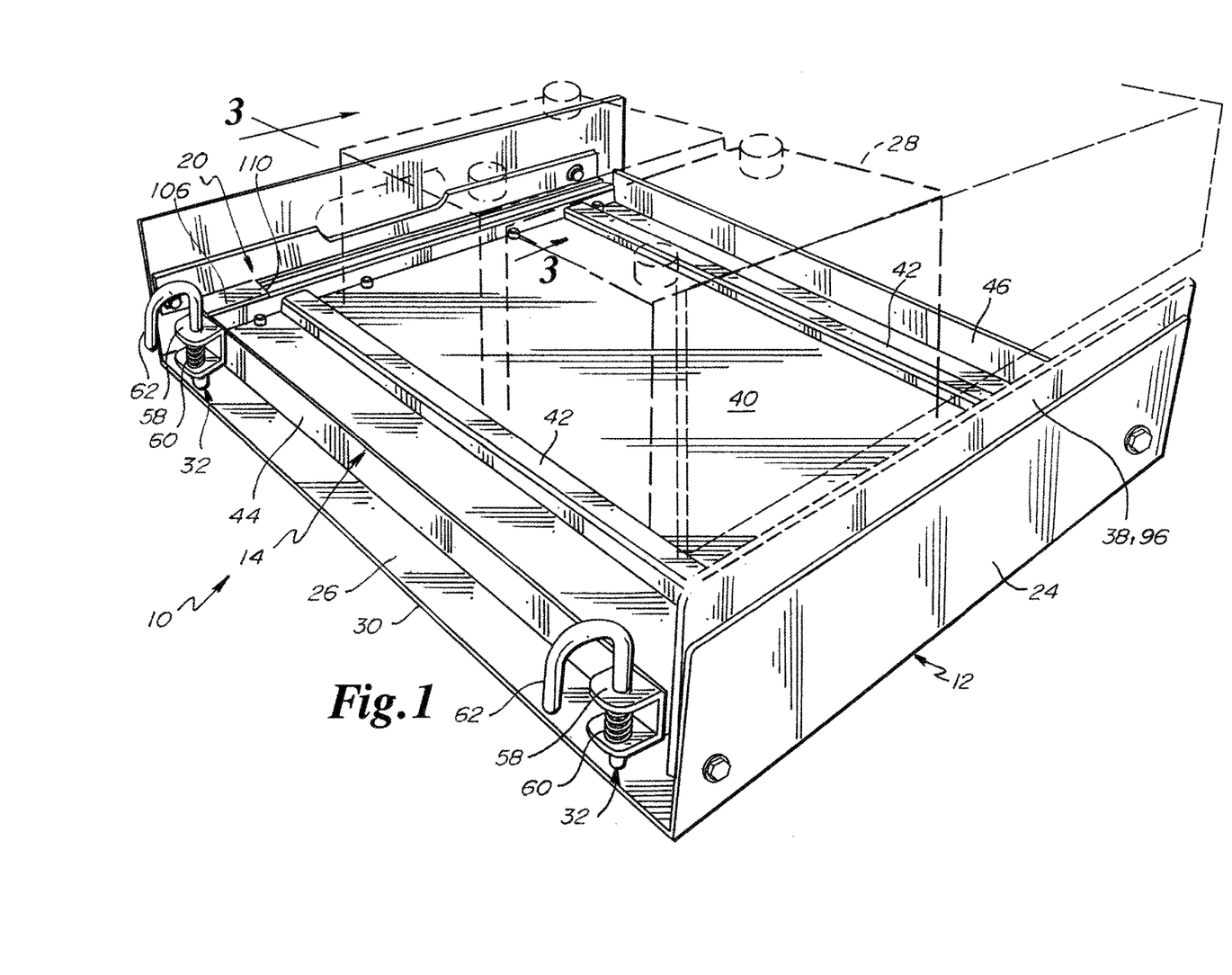
FIG. 1 is an isometric partial phantom line view of one alternative embodiment of the invention.
Figure 2:
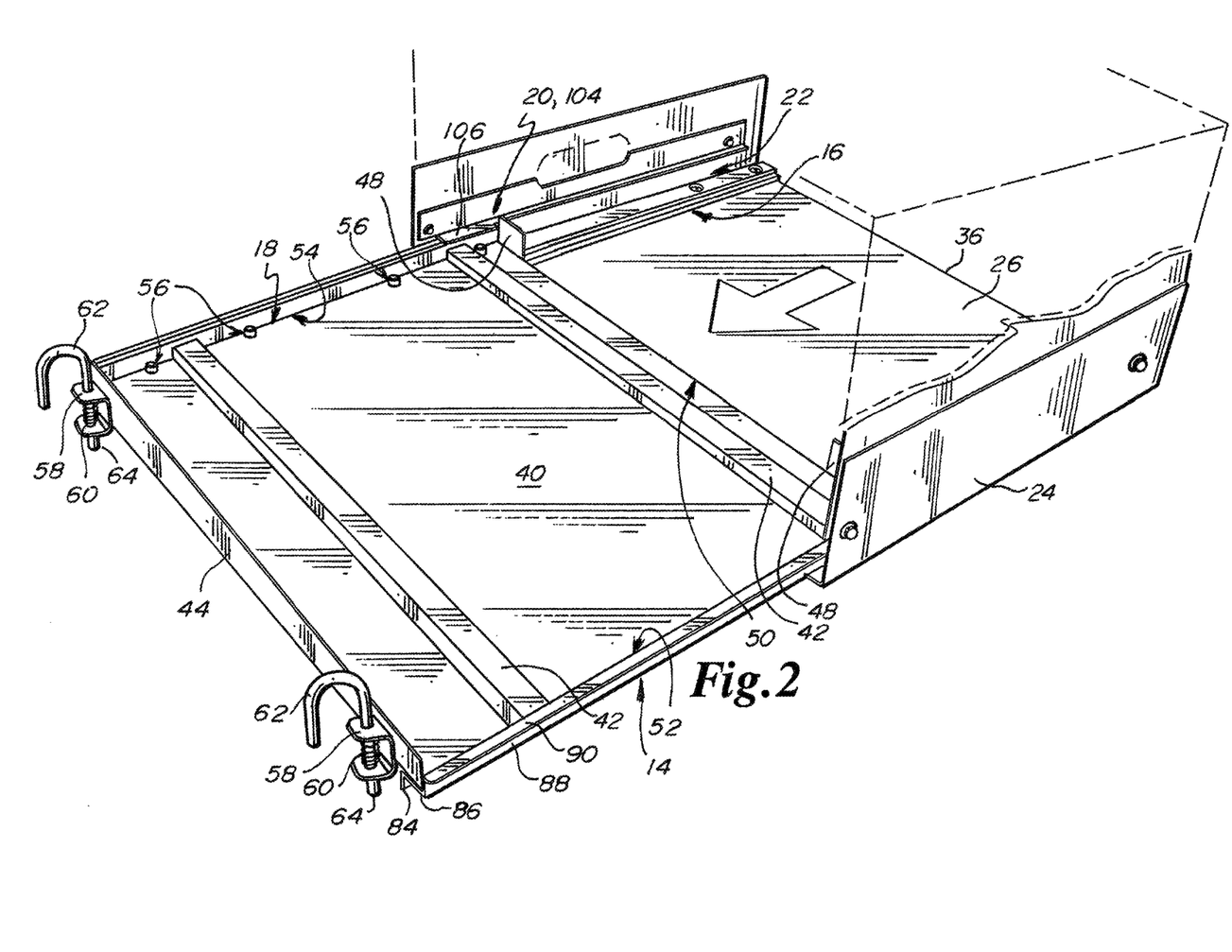
FIG. 2 is an alternative isometric view of one alternative embodiment of the invention.
Figures 3, 4:
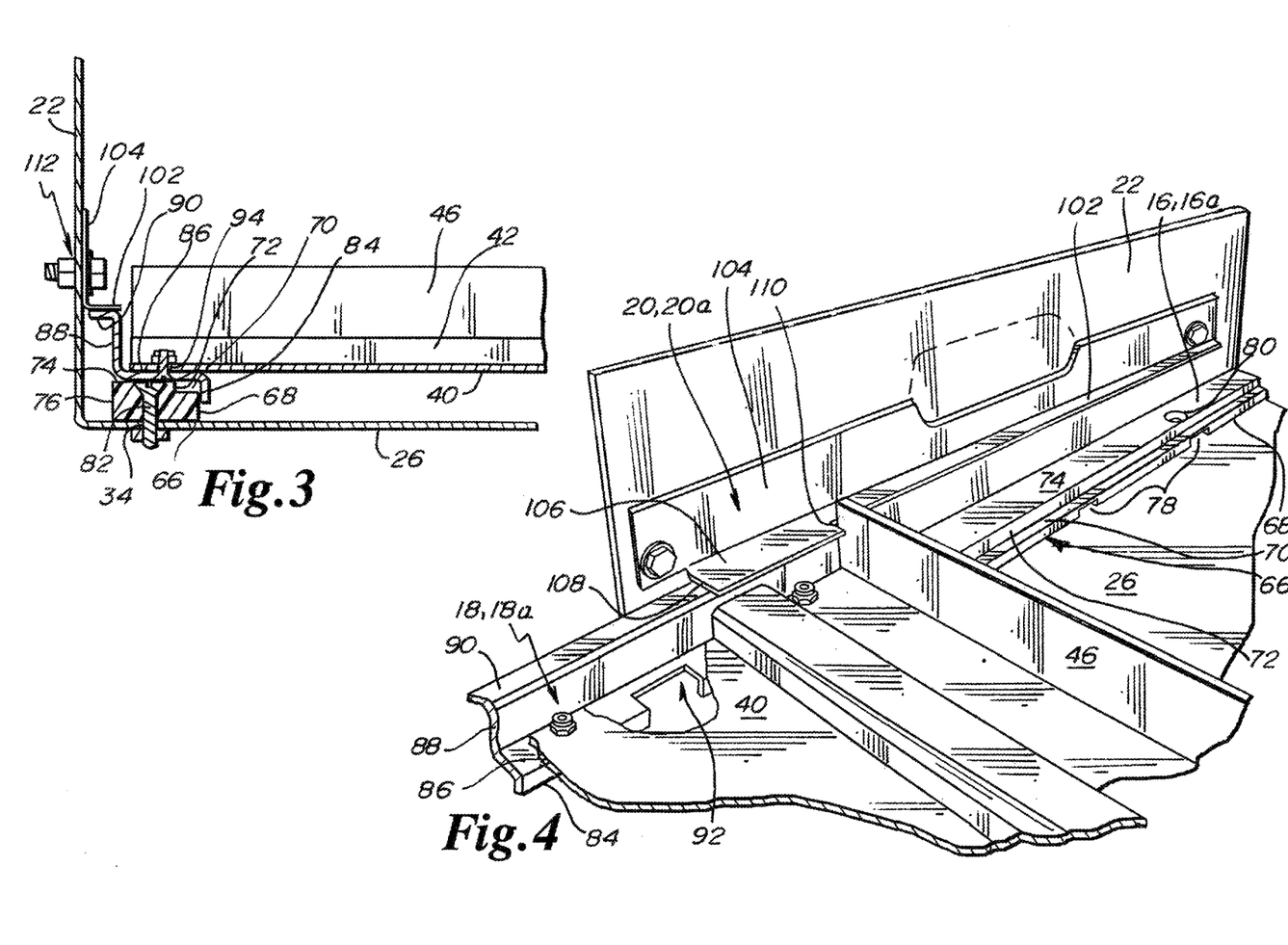
FIG. 3 is a detail cross-sectional side view of one alternative embodiment of the invention taken along the line 3-3 of FIG. 1.
FIG. 4 is a detail isometric, partial broken away view of one alternative embodiment of the invention where the battery tray has been fully withdrawn relative to the battery box.
Figure 5:
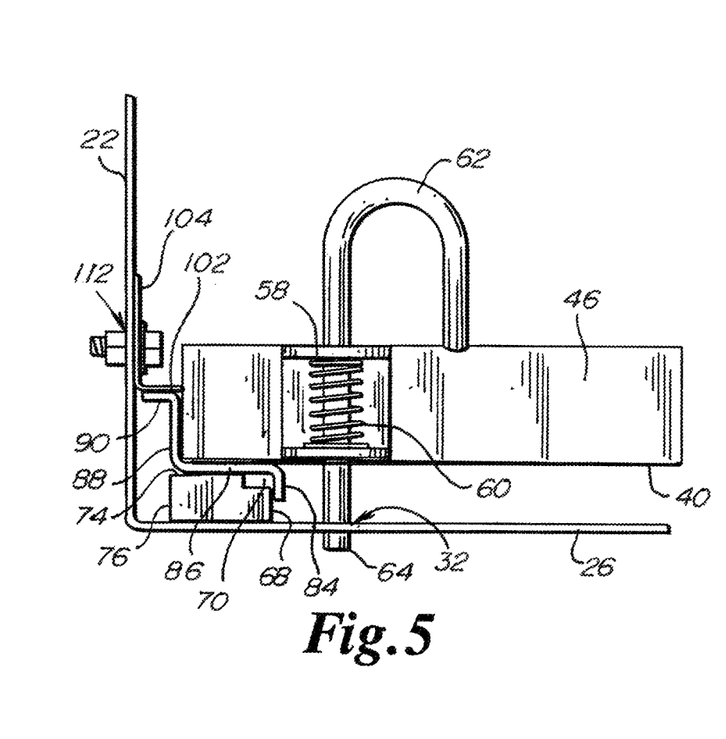
FIG. 5 is a detail front view of one alternative embodiment of the invention showing the latch in a descended position preventing sliding of the battery tray relative to the battery box.
Figure 6:
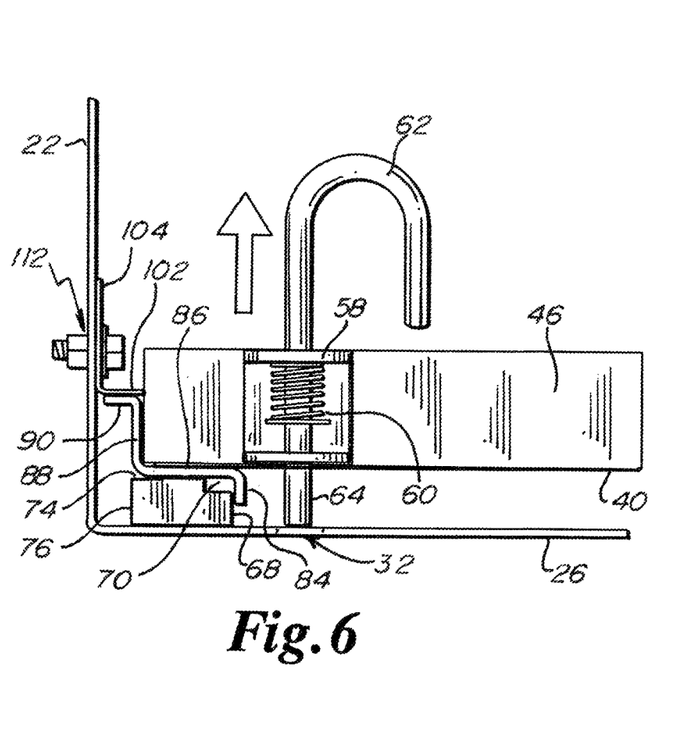
FIG. 6 is a detail front view of one alternative embodiment of the invention showing the latch in an elevated position enabling the sliding of the battery tray relative to the battery box.

In at least one embodiment referring to FIGS. 1, 2, 3, and 4 the battery box 12 may be square or rectangular and is generally u-shaped having a left vertical side 22, a right vertical side 24, and a horizontal base 26 extending between the bottom of the left vertical side 22 and the bottom of the right vertical side 24. In some embodiments, the battery box 12 may also include a back and/or top. Generally, the battery box 12 has an open front which may be used to provide access to the battery tray 14 which may transport one or more 8D or group 31 truck batteries 28 for a vehicle, or other equipment.

In some embodiments the horizontal base 26 has a front edge 30 which may include one or more latching holes 32 or other mechanical elements which are used to facilitate the releasable latching of the battery tray 14 in a stationary closed position relative to the horizontal base 26 and battery box 12.

Continuing to refer to FIGS. 1, 2, 3, and 4 in some embodiments a plurality of affixation holes 34 are regularly spaced along and through the horizontal base 26, proximate to the bottom of both of the left vertical side 22 and right vertical side 24. In general the affixation holes 34 are regularly spaced between the front edge 26 and rearward edge 36 of the horizontal base 26.

In some embodiments, the battery box 12 includes a battery box cover 38 which may be releasably attached to each of the left vertical side 22 and right vertical side 24.

In some embodiments the horizontal base 26, left vertical side 22 and right vertical side 24 are formed of metal material which is not subject to rust or corrosion when exposed to moisture, temperature, or prolonged exposure to weather conditions encountered by a bus, other type of vehicle, or other item of equipment. In some embodiments the horizontal base 26 has dimensions of approximately twenty-four inches deep and twenty eight and ½ inches wide. In alternative embodiments, the depth dimension for the horizontal base 26 may be greater or less than twenty four inches depending on the vehicle or equipment transporting the battery box 12. In some embodiments, the width dimension for the horizontal base 26 may be greater or less than twenty eight and ½ inches depending on the vehicle or equipment transporting the battery box 12.

In some embodiments the dimensions for the left vertical side 22 and right vertical side 24 are approximately twenty four inches long and eighteen inches high. In some embodiments, the length dimension for the left vertical side 22 and right vertical side 24 may be greater or less than twenty four inches depending on the vehicle or equipment transporting the battery box 12. In some embodiments the height dimension for the left vertical side 22 and right vertical side 24 may be greater than or less than eighteen inches depending on the vehicle or equipment transporting the battery box 12.

In some embodiments, the battery box 12 is formed of metal having a thickness dimension of approximately ¹⁄₁₆ inch, or being formed of fourteen gauge or twelve gauge steel. In other embodiments the thickness dimension for the battery box 12 may be greater or less than ¹⁄₁₆ inch, twelve gauge, or fourteen gauge metal dependent upon the requirements of a vehicle or other item of equipment.

In some embodiments, the left vertical side 22 is integral to the horizontal base 26 and is formed relative thereto by bending upwardly therefrom. Likewise, the right vertical side 24 is integral to the horizontal base 26 and is formed relative thereto by bending upwardly therefrom. In some embodiments, the left vertical side 22 and right vertical side 24 are not required to be integral to the horizontal base 26.

In general, the battery box 12 is formed of materials which are sufficiently strong, sturdy, and durable to not rust, corrode, fracture or fail during use in the transportation of one or a plurality of heavy batteries 28 used in association with buses, vehicles, or other items of equipment.

In at least one embodiment, the battery tray 14 includes a horizontal platform 40 which may include one or more elevated structural members or ledges 42. The structural members or ledges 42 may be used to hold transported batteries 28 in a desired location, minimizing shifting or movement of the transported batteries 28 relative to the horizontal platform 40, during use of a vehicle or other item of equipment. The battery tray 14 also includes a front vertical wall 44 and a rear vertical wall 46. The front vertical wall 44 and the rear vertical wall 46 are preferably integral to the horizontal platform 40 extending upwardly therefrom. In some alternative embodiments, the front vertical wall 44 and the rear vertical wall 46 are not required to be integral to the horizontal platform 40 and may be attached thereto.

In some alternative embodiments, the tray 14 does not include a rear vertical wall 46. In this embodiment, an L-shaped bracket 48, or other mechanical element may be attached to the upper surface of the horizontal platform 40 proximate to both a rear edge 50 and either a right edge 52 or left edge 54. In this embodiment the L-shaped bracket 48 or other mechanical element may function as a stop to restrict the forward sliding movement of the battery tray 14 relative to the battery box 12 to prevent separation therefrom.

In some embodiments, both the right edge 52 and the left edge 54 include a plurality of regularly spaced and aligned attachment apertures 56 which are used to releasably secure a battery tray glide 18 proximate to each of the right edge 52 and left edge 54 of the battery tray 14.

In some embodiments, the front vertical wall 44 of the battery tray 14 may include one or a plurality of u-shaped brackets 58. Each u-shaped bracket 58 may include a spring 60 as engaged to a retractable latch member 62. Each retractable latch member 62 preferably includes a latching portion 64 which extends below the u-shaped bracket 58, and each latching portion 64 preferably includes a sufficient length dimension to releasably engage a latching hole 32 or catch disposed proximate to the front edge 30 of the horizontal base 26 of the battery box 12. The releasable insertion and retraction of the latching portion 64 into and out of the latching holes 32 or catch enables the battery tray 14 to be latched relative to the battery box 12 when the battery tray 14 is fully inserted within the battery box 12. When the latching portion 64 is in the engaged position relative to the latching holes 32 or catch, the battery tray 14 is secured from sliding motion or movement relative to the battery box 12.

In some embodiments, the upward retraction or manipulation of the latching member 62 compresses the spring 60 within the U-shaped bracket 58 separating the latching portion 64 from the latching holes 32 or catch, permitting the sliding movement of the battery tray 14 relative to the battery box 12. Upon release of the latching member 62, the spring 60 will expand, manipulating the latching portion 64 downwardly into a descended position.

In some embodiments, the battery tray 14 has a length dimension of approximately twenty one and ½ inches and a width dimension of approximately twenty seven inches. In some alternative embodiments, the length dimension of the battery tray 14 may be larger or smaller than twenty one and ½ inches dependent upon the vehicle or other equipment utilizing the battery box 12. In some embodiments the width dimension of the battery tray 14 may be larger or smaller than twenty seven inches dependent upon the vehicle or other equipment utilizing the battery box 12.

In some embodiments, the front vertical wall 44 and the rear vertical wall 46 each have a width dimension of approximately twenty seven inches and a height dimension of approximately 1¾ inches. In some alternative embodiments, the width dimension of the front vertical wall 44 and the rear vertical wall 46 may be larger or smaller than twenty seven inches dependent upon the vehicle or other equipment utilizing the battery box 12. In some alternative embodiments, the height dimension of the front vertical wall 44 and the rear vertical wall 46 may be larger or smaller than one and three-quarter inches dependent upon the vehicle or other equipment utilizing the battery box 12.

In some embodiments the battery tray 14 is formed of metal having a thickness dimension of approximately 1/16 inch or being twelve gauge or fourteen gauge metal material. In other embodiments, the thickness dimension for the battery tray 14 may be greater or less than 1/16 inch or twelve gauge or fourteen gauge metallic material dependent upon requirements of a vehicle or other equipment transporting heavy batteries 28.

In some embodiments, the front vertical wall 44 is integral to the horizontal platform 40 and is formed relative thereto by bending upwardly therefrom. In some embodiments, the rear vertical wall 46 is integral to the horizontal platform 40 and is formed relative thereto by bending upwardly therefrom. In some alternative embodiments, the front vertical wall 44 and rear vertical wall 46 are not required to be integral to the horizontal platform 40 and may be affixed thereto.

In general, the battery tray 14 is formed of materials which are sufficiently strong, sturdy and durable to not rust, corrode or fracture or fail during use in the transportation of one or a plurality of heavy batteries used in association with a vehicle such as a bus, truck, or other item of heavy equipment.

In at least one embodiment, the battery tray glide system 10 incorporates the use of two glide mounts 16. One glide mount 16 is preferably disposed proximate to each of the left vertical side 22 and right vertical side 24, and above the horizontal base 26 of the battery box 12. Each of the glide mounts 16 is preferably below the horizontal platform 40 of the battery tray 14 and above the horizontal base 26 of the battery box 12.

In at least one embodiment the left glide mount is designated by reference numeral 16b.

In some embodiments, the glide mounts 16 are formed of ultrahigh molecular weight (UHMW) polyethylene material which is a strong and durable abrasion resistant, impact resistant, non-stick, self-lubricating material. In other embodiments, alternative materials may be utilized to fulfill the identified features and functions identified herein including, but not necessarily limited to, other plastic, Teflon®, or composite materials and combinations thereof.

In at least one embodiment, the left glide mount 16a includes a substantially flat lower surface 66, and interior vertical wall 68, a substantially horizontal channel 70 which is located towards the interior or center of the battery box 12. An intermediate vertical wall 72 extends upwardly from the horizontal channel 70. An upper horizontal glide surface 74 extends outwardly to a vertical exterior wall 76, which descends from the upper horizontal glide surface 74 to the exterior edge of the flat lower surface 66.

In at least one embodiment, a plurality of access channels 78 extend substantially normal to the elongated horizontal plane of the flat lower surface 66. The access channels 78 are located to provide clearance to receive fastening elements which may extend upwardly from the upper surface of the horizontal base 26 permitting the majority of the elongated horizontal plane of the flat lower surface 66 to be in contact with the upper surface of the interior of the horizontal base 26, proximate to the right vertical side 24 or left vertical side 22. In at least one embodiment, the upper horizontal glide surface 74 includes a plurality of regularly spaced and aligned affixation apertures 80, which may include countersink portions proximate to the upper horizontal glide surface 74.

A desired number of the affixation apertures 80 are preferably regularly spaced and aligned within the affixation holes 34 to secure the glide mounts 16 to the upper interior surface of the battery box 12. It should be noted that the right glide mount is preferably affixed to the horizontal base 26 proximate to the right vertical side 24. It should also be noted that a mechanical fastening element 82, which may be a bolt and nut, preferably passes through the affixation holes 34 and affixation apertures 80 to secure the glide mounts 16 to the battery box 12.

It should also be noted that the glide mounts 16 are preferably releasably secured to the battery box 12 permitting replacement of the glide mounts 16 if desired.

In at least one embodiment, the right glide mount is a mirror image of the left glide mount 16a including the identical features as identified for the left glide mount 16a including the flat lower surface 66, the interior vertical wall 68, the horizontal channel 70, the intermediate wall 72, the upper horizontal glide surface 74, and the vertical exterior wall 76. Both the left glide mount 16a and the right glide mount may have access channels 78. The left glide mount 16b further includes the regularly spaced and aligned affixation apertures 80 as earlier described.

In at least one embodiment, the right glide mount is preferably affixed to the horizontal base 26 proximate to the right vertical side 24 where the horizontal channel 70 extends towards the interior or center of the battery box 12 from the top of the interior vertical wall 68.

A mechanical fastening element 82 is also used to releasably secure the right glide mount to the horizontal base 12.

In at least one embodiment the upper horizontal glide surface 74 of both the right glide mount and left glide mount 16a functions as a sliding bearing surface for the battery tray glide rails 18 permitting the slidable movement of the battery tray 14 relative to the battery box 12.

In at least one embodiment the horizontal channels 70 function to provide space to receive portions of mechanical fastening elements which may be used with certain types of manufacture of battery boxes 12 and/or battery trays 14. The horizontal channels 70 may therefore be a location for the affixation apertures 80 in certain manufacturers of battery boxes 12 and battery trays 14.

In at least one embodiment, the glide mounts 16 have a length dimension of approximately twenty one inches, a width dimension of approximately 1½ inches and a height dimension of approximately three-quarters of an inch. In some alternative embodiments, the glide mounts 16 may have a length dimension which is larger or smaller than twenty one inches dependent upon the requirements of the vehicle or other equipment transporting heavy batteries. In other embodiments, the width dimension for the glide mounts 16 may be larger or smaller than 1½ inch dependent upon the requirements of the vehicle or other equipment transporting heavy batteries or other items. In addition, in some embodiments the height dimension for the glide mounts 16 may be larger or smaller than ¾ inch dependent upon the requirements of vehicle or other equipment transporting heavy batteries or other items.

In some embodiments the horizontal channel 70 has a length dimension of approximately twenty one inches and a width dimension of ½ inch and the intermediate vertical wall 72 has a height dimension of approximately 3/16 inch. It should be noted that the length, width and height dimensions identified for the horizontal channel 70, and the intermediate vertical wall 72, may be larger or smaller than the dimensions identified dependent upon the requirements of a vehicle or other equipment transporting heavy batteries or other items.

In at least one embodiment the battery tray glide system 10 incorporates the use of two battery tray glide rails 18. The left tray glide rail 18a is preferably disposed below, and to the exterior side of the horizontal platform 40, and is proximate to the left edge 54 of the battery tray 14 within the battery box 12. The right tray glide rail is preferably disposed below and to the exterior side of the horizontal platform 40 and is proximate to the right edge 52 of the battery tray 14 within the battery box 12. Each of the right tray glide rail and left tray glide rail 18a is preferably disposed above the horizontal base 26 within the interior of the battery box 12.

In some embodiments the right tray glide rail and the left tray glide rail 18a are mirror images of each other and are formed of stainless steel material having a thickness dimension of approximately 1/16 inch, or are formed of twelve gauge or fourteen gauge steel. The tray glide rails 18 may be formed of alternative metallic, plastic, or composite materials or combinations thereof provided the material selected does not rust, corrode, fracture, bend or fail during the use of the battery tray glide system 10 described herein.

The thickness dimension for the battery tray glide rails 18 may be larger or smaller than 1/16 inch or greater than fourteen gauge or less than twelve gauge steel dependent upon the requirements of a vehicle or other equipment transporting heavy batteries or other items.

In at least one embodiment, the tray glide rails 18 each include an interior vertical flange 84, a horizontal bearing ledge 86, a vertical support wall 88, and a horizontal glide ledge 90.

In at least one embodiment, the interior vertical flange 84 extends downwardly from the lower surface of the horizontal bearing ledge 86, and is positioned adjacent an interior with respect to the interior vertical wall 68 of the glide mounts 16. In some embodiments, the interior vertical flange 84 is formed relative to the horizontal bearing ledge 86 by bending downwardly therefrom.

In some embodiments, the horizontal bearing ledge 86 is positioned for sliding engagement relative to the upper horizontal glide surface 74 of the glide mounts 16.

In some embodiments, the vertical support wall 88 is positioned proximate and is exterior of the respective right edge 52 or left edge 54 of the horizontal platform 40. In some alternative embodiments the front of the vertical support walls 88 are also positioned proximate to either the right side of the front vertical wall 44 or the left side of the front vertical wall 44. In addition, the back of the vertical support walls 88 may also be positioned proximate to either the right side of the rear vertical wall 46 or the left side of the rear vertical wall 46.

In at least one embodiment the vertical support wall 88 is formed relative to the horizontal bearing ledge 86 by bending at an angle of approximately 90° upwardly therefrom.

In at least one embodiment a horizontal glide ledge 90 extends outwardly from the top of the vertical support wall 88 and is formed relative thereto by bending horizontally outwardly therefrom.

In some embodiments the height dimension of the interior vertical flange 84 is approximately ½ inch. In some alternative embodiments the height dimension selected for the interior vertical flange 84 may be larger or smaller than ½ inch depending on the requirements of the vehicle or other equipment transporting heavy batteries 28 or other items.

In some embodiments the width dimension of the horizontal bearing ledge 86 is approximately 1½ inches. In some alternative embodiments, the width dimension of the horizontal bearing ledge 86 may be greater than or smaller than 1½ inches dependent on the requirements of the vehicle or other equipment transporting heavy batteries 28 or other items.

In some embodiments, the height dimension of the vertical support wall 88 is approximately 1 inch. In some alternative embodiments, the height dimension of the vertical support wall 88 may be larger or smaller than 1 inch dependent upon the requirements of the vehicle or other equipment transporting heavy batteries 28 or other items.

In some embodiments, the horizontal glide ledge 90 has a width dimension of approximately ½ inch. In some alternative embodiments the width dimension of the horizontal glide ledge 90 may be larger or smaller than ½ inch depending on the requirements of the vehicle or other equipment transporting heavy batteries or other items.

In at least one alternative embodiment, the battery tray glide rails 18 have a length dimension of approximately twenty one and ½ inches. In some alternative embodiments the length dimension for the battery tray glide rails 18 may be greater than or less than twenty one and ½ inches dependent on the requirements of the vehicle or other equipment transporting heavy batteries or other items.

In at least one embodiment the interface between the interior vertical flange 84 and the horizontal bearing ledge 86 may include one or a plurality of cut-out passages 92. The cut-out passages 92 preferably function to permit the battery tray glide rails 18 to be used with a variety of different manufacturers of battery trays 14. The cut-out passages 92 preferably function to provide sufficient space for original fastening elements on the battery tray 14 to remain below the battery tray glide rails 18. Alternatively, the one or plurality of cut-out passages 92 facilitate the use of mechanical fasteners to releasably secure the glide mounts 16 to the horizontal base 26 without contact between either the interior vertical flange 84 and/or the horizontal bearing ledge 86 and the mechanical fastener used to secure the glide mounts 16 to the horizontal base 26.

In some embodiments, the horizontal bearing ledge 86 includes a plurality of regularly or irregularly spaced attachment openings 94 which may be used to secure the horizontal bearing ledge 86 to the lower surface of the horizontal platform 40 of the battery tray 14.

In some embodiments the regularly or irregularly spaced attachment openings 94 are located proximate to the vertical support wall 88. In at least one embodiment the forward edge of the horizontal bearing ledge 86 is positioned below and is in contact with the lower edge of the front vertical wall 44. In some embodiments where a rear vertical wall 46 is provided, the rear edge of the horizontal bearing ledge 86 is positioned below and is in contact with the lower edge of the rear vertical wall 46.

In at least one embodiment the horizontal glide ledge 90 extends outwardly from the top of the left battery tray glide rail 18*a* at an angle of approximately 90° towards the left vertical side 22 of the battery box 12. In at least one embodiment, horizontal glide ledge 90 of the right battery tray glide rail extends outwardly from the top of the right battery tray glide rail at an angle of approximately 90° towards the right vertical side 24 of the battery box 12.

In at least one embodiment, the attachment openings 94 on the underside of the horizontal bearing ledge 86 are countersunk to receive mechanical fasteners which may be screws or bolts and nuts to secure the battery tray glide rails 18 to the underside of the battery tray 14.

The mechanical fasteners identified herein may be formed of stainless steel hardware and may be $^{10}\!/\!_{32} \times \frac{1}{2}$ Machine Screws with $^{10}\!/\!_{32}$ Nylon Lock and Nuts; $\frac{1}{4}" \times 20 \times 1\frac{1}{2}$ Machine Screws with $\frac{1}{4}: \times 20$ Nylon Lock and Nuts; or other sizes of machine screws, bolts and nuts as desired dependent on the specific vehicle specifications and requirements.

In at least one embodiment the battery tray glide system 10 incorporates the use of two upper glide rails 20. The left upper glide rail 20*a* is preferably proximate to and is disposed above the horizontal glide ledge 90 of the left battery tray glide rail 18*a*. The left upper glide rail 20*a* is also preferably partially between the left vertical side 22 and a left wall 100 of a battery cover 38 being sandwiched there between.

In at least one embodiment the right upper glide rail is proximate to and is disposed above the horizontal glide ledge 90 of the right battery tray glide rail. The right upper glide rail is also preferably partially between the right vertical side 24 and the right wall 96 of a battery cover 38 being sandwiched there between.

In some embodiments the left upper glide rail 20*a* and the right upper glide rail are in contact with horizontal glide ledge 90 of the respective left battery tray glide rail 18*a* and right battery tray glide rail.

In some embodiments, the left upper glide rail 20*a* and right upper glide rail are formed of stainless steel material having a thickness dimension of approximately $\frac{1}{16}$ inch or being formed of twelve or fourteen gauge steel. The upper glide rails 20 may be formed of alternative metallic materials, plastic or composite materials or combinations thereof provided the materials selected to not rust, corrode, fracture, bend or fail during use of the battery tray glide system 10 described herein.

The thickness dimension selected for the upper glide rails 20 may be larger or smaller than $\frac{1}{16}$ inch or larger than fourteen gauge or smaller than twelve gauge steel dependent upon the requirements of a vehicle or other equipment transporting heavy batteries or other items.

In at least one embodiment, the upper glide rails 20 include a horizontal retaining ledge 102 and a vertical attachment wall 104. In at least one embodiment, the horizontal retaining ledges 102 are positioned above, and are immediately adjacent to the upper surface of the respective horizontal glide ledges 90. In at least one alternative embodiment the horizontal retaining ledges 102 are formed relative to the vertical attachment walls 104 by bending inwardly therefrom. In at least one embodiment, the horizontal retaining ledges 102 extend horizontally and inwardly at an angle of approximately 90° from the vertical attachment walls 104 towards the center of the battery box 12. In some embodiments, the horizontal retaining ledges 102 are positioned for sliding and supporting engagement relative to the upper surface of the horizontal glide ledges 90.

In some embodiments, the forward portion of each horizontal retaining ledge 102 includes a horizontally extending slide restriction member 106. The slide restriction member 106 is preferably integral to the horizontal retaining ledge 102.

In some embodiments, the horizontal retaining ledge 102 has a width dimension of approximately $\frac{1}{2}$ inch. In some alternative embodiments, the width dimension for the horizontal retaining ledge 102 may be larger or smaller than $\frac{1}{2}$ inch depending upon the width dimension selected for the horizontal glide ledge 90.

In at least one embodiment the lower surface of the horizontal retaining ledge 102 of the left upper glide rail 20*a* is in contact with the upper surface of the horizontal glide ledge 90 of the left battery tray glide rail 18*a*. In at least one embodiment, the lower surface of the horizontal retaining ledge 102 of the right upper glide rail is in contact with the upper surface of the horizontal glide ledge 90 of the right battery tray glide rail.

During use of the battery tray glide system 10, as the battery tray 14 is drawn outwardly away from the battery box 12, the horizontal bearing ledges 86 will slide outwardly along the top surface of the upper horizontal glide surfaces 74 of the glide mounts 16. The battery tray 14 transporting heavy batteries 28 or other items, then due to gravity, will exert a downward force on the forward end of the battery tray 14, which in turn will create an upward force proximate to the rear edge 50. The upward force of the rear edge 50 will cause an upward force on the rear portion of the horizontal glide ledge 90 to attempt to cause separation from the glide mounts 16, and binding of the battery tray 14 within the battery box 12. The upward force on the rear portion of the horizontal glide ledge 90 will cause the upward force to be exerted on the horizontal retaining ledge 102 of the upper glide rails 20, which in turn will evenly dissipate the upward force along the entire length of the upper glide rails 20. The upper glide rails 20 as secured to the right vertical side 24 and left vertical side 22 of the battery box 12 prevents the upward movement of the rear portion of the horizontal glide ledge 90 relative to the horizontal retaining ledge 102. The battery tray 14 may therefore be withdrawn outwardly from, or pushed inwardly into, the battery box 12 during transportation of heavy batteries 28 or other items by sliding of the battery tray glide rails 18 between the upper glide rails 20 and the glide mounts 16.

In at least one embodiment, a slide restriction member 106 is located proximate to a forward end. In some embodiments the slide restriction member forward edge 108 is rearwardly from the forward edge of the vertical attachment wall 104 by approximately 1 inch. In some alternative embodiments the slide restriction member forward edge 108 may be located rearwardly from the front edge of the vertical attachment wall 104 by a dimension of more or less than 1 inch dependent upon the size of the battery tray 14 and/or battery box 12 and the specifications required by a user.

In at least one embodiment the slide restriction member 106 includes a rearward stop edge 110 which is adapted to contact the L-shaped bracket 48 and/or the rear vertical wall 46 to restrict the forward withdraw of the battery tray 14 relative to the battery box 12. In at least one embodiment, the horizontal bearing ledge 86 will slide forwardly between the glide mounts 16 and the upper glide rails 20 until the rear vertical wall 46 or L-shaped bracket 48 contacts the rearward stop edge 110, where further forward movement or withdraw of the battery tray 14 from the battery box 12 will be terminated/prohibited.

In at least one embodiment, the forward edge 108 extends outwardly from the vertical attachment wall 104 by a dimension of approximately 1 inch. In some alternative embodiments, the size dimension for the forward edge 108 may be larger or smaller than 1 inch dependent on the size requirements and dimensions for the battery tray glide system 10.

In some embodiments, the rearward stop edge 110 extends outwardly from the horizontal retaining ledge 102 approximately ½ inch. In some alternative embodiments the size dimension for the rearward stop edge 110 may be larger or smaller than ½ inch dependent on the size requirements and dimensions for the battery tray 14 and battery tray glide system 10.

In at least one embodiment, the slide restriction member 106 has a length dimension of approximately 3 inches. In some alternative embodiments, the length dimension of the slide restriction member 106 may be greater or less than 3 inches dependent on the size requirements and dimensions for the battery tray glide system 10.

In at least one embodiment, the vertical attachment wall 104 has a length dimension of approximately twenty two inches. The length dimension for the vertical attachment wall 104 may be larger or smaller than twenty two inches dependent upon the size requirements and dimensions for the battery tray glide system 10.

In at least one embodiment, the vertical attachment wall 104 has a height dimension of approximately 1½ inches. The height dimension for the vertical attachment wall 104 may be larger or smaller than 1½ inches dependent upon the size requirements and dimensions for the battery tray glide system 10.

In at least one embodiment, the vertical attachment wall 104 of the upper glide rails 20 includes a plurality of affixation openings 112. The affixation openings 112 are constructed and arranged to receive mechanical fastening elements which may be nuts and bolts to secure the vertical attachment walls 104 to the respective left vertical side 22 and right vertical side 24 of the battery box 12. Alternatively, the affixation openings 112 are constructed and arranged to receive mechanical fastening elements which may be nuts and bolts to secure the vertical attachment walls 104 to the respective left vertical side 22, right vertical side 24, left wall 100, and right wall 96 of both the battery box 12 and the battery box cover 38, sandwiching the respective vertical attachment walls 104 there between.

In at least one embodiment the vertical attachment walls 104 along the upper edge thereof may include one or more cut-away sections to provide a relief area for passage of battery cables to the vehicle electrical systems, the battery cables traversing out of the battery box 12 past either the right or left vertical walls 104.

A method for replacement of a battery compartment slide components for a vehicle or other item of equipment include the step of removing batteries from the battery box and tray and dismantling and removing the battery tray from the battery box. The second step will be to remove and discard factory slide rails from the battery box. The third step will be to clean the battery tray and the battery box removing any dirt, rust and debris in preparation for the installation of the Battery Tray Glide System. The fourth step will be to install new battery tray glide rails to the bottom of the tray as described in this disclosure. The fifth step will be to set the glide mounts on the platform of the battery box proximate to the outer sides of the battery box with the two side by side, predrilled holes in the glide mounts facing outward; the sixth step will be to position the glide mounts behind the first rivet of the battery box. The seventh step will be to set the battery tray on the glide mounts leaving approximately ⅛" between the battery box and the upper lip of the battery tray glide rail. To properly operate, there should be no contact between the battery box and the upper lip of the battery tray glide rail. The eighth step will be to correctly position the glide mounts, and to slide the battery tray as far back into the battery box as possible. The glide mounts should be tight with the lower lip of the battery tray glide rail. This step attempts to ensure that the battery tray is secure and will not slide forward or backward when the bus or vehicle is in motion. The ninth step will be to mark the position of the glide mounts on the battery box. The tenth step will be to remove battery tray. The eleventh step will be to with the glide mounts in position and to drill a ¼" hole, using the glide mounts as a guide, through the predrilled hole closest to the center of the battery box and to snuggly install ¼×20 tapered machine screws and nylon lock nuts to hold the front of the glide mounts in position. The twelfth step will be to install the battery tray ⅔ of the way in on the glide mounts and repeat steps 9-11 for the existing two battery tray glide rail mounting holes and securely tightening with machine screws. The thirteenth step will be to remove the four bolts holding the plastic battery tray cover in place and to reinstall the battery tray. Further to position the upper glide rail between the battery box and the plastic battery box cover. Align the holes with the existing battery cover mounting holes where the wide flanges, which function as the tray stop, are located to the outside of the battery box and facing each other. The fourteenth step will be to loosely reinstall the bolts of battery box plastic cover with the upper glide rail in a desired position and leaving a slight space of approximately 0.020 inches between the upper glide rail and the battery tray glide rail in order to avoid the tilting of the battery box when the tray is pulled outwardly or if resistance occurs if instillation is too tight. The fifteenth step will be to securely tighten the bolts and reinstall batteries on the battery tray.

The above steps result in a battery glide system having design features and materials which are superior with respect to impact resistance, durability, requiring less maintenance than existing factory stock products.

In a first embodiment a tray glide system comprises a frame, the frame having an interior, a right vertical side, a left vertical side, and a horizontal base extending between the right vertical side and the left vertical side; a tray is slidably engaged in the interior of the frame, the tray having a platform having a front, a rear, a right edge extending between the front and the rear and a left edge extending between the front and the rear; at least two glide mounts, the glide mounts being formed of ultra-high molecular weight polyethylene, each of the glide mounts comprising a lower surface positioned proximate to the base, an interior vertical wall, an upper glide surface positioned proximate to an underside of the platform, and a vertical exterior wall, the vertical exterior wall being disposed proximate to one of the right vertical side and the left vertical side, the glide mounts being engaged to the base proximate to one of the right vertical side and the left vertical side; at least two tray glide rails, each of the tray glide rails comprising an interior vertical flange extending downwardly from a bearing ledge, each of the interior vertical flanges being disposed proximate to one of the interior vertical walls, each of the bearing ledges being disposed proximate to and above one of the upper glide surfaces and below the platform, each of the tray glide rails further comprising a vertical support wall extending upwardly from the bearing ledge distal from the interior vertical flange and exterior to one of the right edge and the left edge, and a guide ledge extending outwardly from an upper portion of the vertical support wall away from the interior vertical flange; and at least two upper glide rails, each of the upper glide rails comprising a horizontal retaining ledge being disposed proximate to and above one of the guide ledges, the horizontal retaining ledge extending inwardly from a vertical attachment wall, each of the vertical attachment walls being engaged to one of the right vertical side and the left vertical side.

In a second embodiment according to the first embodiment, the interior vertical wall is disposed towards a center of the base.

In a third embodiment according to the second embodiment, each of the tray glide rails is formed of metal material.

In a fourth embodiment according to the third embodiment, each of the bearing ledges extend horizontally outwardly from one of the interior vertical flanges away from the center of the base.

In a fifth embodiment according to the fourth embodiment, the guide ledges extend away from the center of the base towards one of the right vertical side and the left vertical side.

In a sixth embodiment according to the fifth embodiment, each of the upper glide rails is formed of metal material.

In a seventh embodiment according to the sixth embodiment, the vertical attachment walls extend upwardly from an exterior side of the horizontal retaining ledges.

In an eighth embodiment according to the seventh embodiment, each of the vertical attachment walls are engaged to one of the right vertical side and the left vertical side.

In a ninth embodiment according to an eighth embodiment, the horizontal retaining ledge comprises a slide restriction member.

In a tenth embodiment according to a ninth embodiment, the rear comprises at least one of a stop and a rear wall, the at least one stop or the rear wall engaging the slide restriction member in an open configuration limiting outward sliding of the tray relative to the frame.

In an eleventh embodiment according to the tenth embodiment the tray comprises a front wall proximate to the front.

In a twelfth embodiment according to the eleventh embodiment the front wall comprises at least one latching member, the frame further comprises a front edge, the front edge having at least one catch, wherein the at least one latching member releasably engages the at least one catch when the tray is in a closed configuration relative to the frame.

In a thirteenth embodiment, a tray glide system comprises a box frame, the box frame having an interior, a right vertical side, a left vertical side, and a horizontal base extending between the right vertical side and the left vertical side; a tray is slidably engaged in the interior of the box frame, the tray having a platform having a front, a rear, a right edge extending between the front and the rear and a left edge extending between the front and the rear; at least two glide mounts, the glide mounts being formed of ultra-high molecular weight polyethylene, each of the glide mounts comprising a lower surface positioned proximate to the base, an interior vertical wall disposed towards a center of the base, an upper glide surface positioned proximate to an underside of the platform, and a vertical exterior wall, one of the vertical exterior walls being disposed proximate to one of the right vertical side and the left vertical side, each of the glide mounts being engaged to the base proximate of one of the right vertical side and the left vertical side; at least two tray glide rails, each of the tray glide rails being formed of metal material, each of the tray glide rails comprising an interior vertical flange extending downwardly from a bearing ledge, each of the interior vertical flanges being disposed proximate to one of the interior vertical walls, each of the bearing ledges extending horizontally outwardly from one of the interior vertical flanges away from the center of the base, each of the bearing ledges being disposed proximate to and above one of the upper glide surfaces and below the platform, each of the tray glide rails further comprising a vertical support wall extending upwardly from the bearing ledge distal from the interior vertical flange and exterior to one of the right edge and the left edge, and a guide ledge extending outwardly from an upper portion of the vertical support wall away from the center of the base towards one of the right vertical side and the left vertical side; and at least two upper glide rails, each of the upper glide rails being formed of metal material, each of the upper glide rails comprising a horizontal retaining ledge being disposed proximate to and above one of the guide ledges, the horizontal retaining ledge extending inwardly from a vertical attachment wall, the vertical attachment wall extending upwardly from an exterior side of the horizontal retaining ledge, each of the vertical attachment walls being engaged to one of the right vertical side and the left vertical side.

In a fourteenth embodiment according to the thirteenth embodiment the horizontal retaining ledge comprises a slide restriction member.

In a fifteenth embodiment according to the fourteenth embodiment the rear comprises at least one of a stop and a rear wall, the at least one stop or the rear wall engaging the slide restriction member in an open configuration limiting outward sliding of the tray relative to the box frame.

In a sixteenth embodiment according to the fifteenth embodiment the tray comprises a front wall proximate to the front.

In a seventeenth embodiment according to the sixteenth embodiment the front wall comprises at least one latching member, the box frame further comprises a front edge, the front edge having at least one catch, wherein the at least one latching member releasably engages the at least one catch when the tray is in a closed configuration relative to the box frame.

While this invention may be embodied in many different forms, there are shown in the drawings and described in detail herein specific embodiments of the invention. The present disclosure is an exemplification of the principles of the invention and is not intended to limit the invention to the particular embodiments illustrated.

The present invention may be embodied in other specific forms without departing from the spirit or essential attributes thereof; and it is, therefore, desired that the present description be considered in all respects as illustrative and not restrictive, reference being made to the appended claims rather than to the foregoing description to indicate the scope of the invention.

In addition to being directed to the embodiments described above and claimed below, the present invention is further directed to embodiments having different combinations of the features described above and claimed below. As such, the invention is also directed to other embodiments having any other possible combination of the dependent features claimed below.

Those skilled in the art may also recognize other equivalents to the specific embodiments described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

This completes the description of the embodiments of the invention. Those skilled in the art may recognize other equivalents to the specific embodiment described herein which equivalents are intended to be encompassed by the claims attached hereto.

I claim:

1. A battery tray glide system comprising:
a frame, said frame having an interior, a right vertical side, a left vertical side, and a horizontal base extending between said right vertical side and said left vertical side;
a tray slidably engaged within said interior of said frame, said tray having a platform having a front, a rear, a right edge extending between said front and said rear and a left edge extending between said front and said rear;
at least two glide mounts one of said glide mounts being engaged to said base proximate to said right vertical side and one of said glide mounts being engaged to said base proximate to said left vertical side, said glide mounts being formed of ultra-high molecular weight polyethylene, each of said glide mounts comprising a lower surface positioned proximate to said base, an interior vertical wall, an upper glide surface positioned proximate to an underside of said platform, and a vertical exterior wall one of, said vertical exterior walls being disposed proximate to said right vertical side and one of said vertical exterior walls being disposed proximate to said left vertical side:
at least two tray glide rails, each of said tray glide rails comprising an interior vertical flange extending downwardly from a bearing ledge, each of said interior vertical flanges being disposed proximate to one of said interior vertical walls, each of said bearing ledges being disposed proximate to and above one of said upper glide surfaces and below said platform, each of said tray glide rails further comprising a vertical support wall extending upwardly from said bearing ledge distal from said interior vertical flange and exterior to one of said right edge and said left edge, and a guide ledge extending outwardly from an upper portion of said vertical support wall away from said interior vertical flange; and
at least two upper glide rails, each of said upper glide rails comprising a horizontal retaining ledge being disposed proximate to and above one of said guide ledges, said horizontal retaining ledge extending inwardly from a vertical attachment wall, each of said vertical attachment walls being engaged to one of said right vertical side and said left vertical side.

2. The battery tray glide system according to claim 1, wherein said interior vertical wall is disposed towards a center of said base.

3. The battery tray glide system according to claim 2, wherein each of said tray glide rails is formed of metal material.

4. The battery tray glide system according to claim 3, wherein each of said bearing ledges extend horizontally outwardly from one of said interior vertical flanges away from said center of said base.

5. The battery tray glide system according to claim 4, wherein said guide ledge extends away from said center of said base towards one of said right vertical side and said left vertical side.

6. The battery tray glide system according to claim 5, wherein each of said upper glide rails is formed of metal material.

7. The battery tray glide system according to claim 6, wherein said vertical attachment walls extend upwardly from an exterior side of said horizontal retaining ledges.

8. The battery tray glide system according to claim 7, wherein each of said vertical attachment walls are engaged to one of said right vertical side and said left vertical side.

9. The battery tray glide system according to claim 8, said horizontal retaining ledge comprising a slide restriction member.

10. The battery tray glide system according to claim 9, said rear comprising at least one of a stop and a rear wall, said at least one stop or said rear wall engaging said slide restriction member in an open configuration limiting outward sliding of said tray relative to said frame.

11. The battery tray glide system according to claim 10, said tray comprising a front wall proximate to said front.

12. The battery tray glide system according to claim 11, said front wall comprising at least one latching member, said frame further comprising a front edge, said front edge having at least one catch, wherein said at least one latching member releasably engages said at least one catch when said tray is in a closed configuration relative to said frame.

13. A battery tray glide system comprising:
a box frame, said box frame having an interior, a right vertical side, a left vertical side, and a horizontal base extending between said right vertical side and said left vertical side;
a tray slidably engaged in said interior of said box frame, said tray having a platform having a front, a rear, a right edge extending between said front and said rear and a left edge extending between said front and said rear;
at least two glide mounts one of said glide mounts being engaged to said base proximate to said right vertical side and one of said glide mounts being engaged to said base proximate to said left vertical side, said glide mounts being formed of ultra-high molecular weight polyethylene, each of said glide mounts comprising a lower surface positioned proximate to said base, an interior vertical wall disposed towards a center of said base, an upper glide surface positioned proximate to an underside of said platform, and a vertical exterior wall, one of said vertical exterior walls being disposed proximate to said right vertical side and one of said vertical exterior walls being disposed proximate to said left vertical side;

at least two tray glide rails, each of said tray glide rails being formed of metal material, each of said tray glide rails comprising an interior vertical flange extending downwardly from a bearing ledge, each of said interior vertical flanges being disposed proximate to one of said interior vertical walls, each of said bearing ledges extending horizontally outwardly from one of said interior vertical flanges away from said center of said base, each of said bearing ledges being disposed proximate to and above one of said upper glide surfaces and below said platform, each of said tray glide rails further comprising a vertical support wall extending upwardly from said bearing ledge distal from said interior vertical flange and exterior to one of said right edge and said left edge, and a guide ledge extending outwardly from an upper portion of said vertical support wall away from said center of said base towards one of said right vertical side and said left vertical side; and at least two upper glide rails, each of said upper glide rails being formed of metal material, each of said upper glide rails comprising a horizontal retaining ledge being disposed proximate to and above one of said guide ledges, said horizontal retaining ledge extending inwardly from a vertical attachment wall, said vertical attachment wall extending upwardly from an exterior side of said horizontal retaining ledge, each of said vertical attachment walls being engaged to one of said right vertical side and said left vertical side.

14. The battery tray glide system according to claim 13, said horizontal retaining ledge comprising a slide restriction member.

15. The battery tray glide system according to claim 14, said rear comprising at least one of a stop and a rear wall, said at least one stop or said rear wall engaging said slide restriction member in an open configuration limiting outward sliding of said tray relative to said box frame.

16. The battery tray glide system according to claim 15, said tray comprising a front wall proximate to said front.

17. The battery tray glide system according to claim 16, said front wall comprising at least one latching member, said box frame further comprising a front edge, said front edge having at least one catch, wherein said at least one latching member releasably engages said at least one catch when said tray is in a closed configuration relative to said box frame.

* * * * *